US011833488B2

(12) United States Patent
Biener et al.

(10) Patent No.: US 11,833,488 B2
(45) Date of Patent: Dec. 5, 2023

(54) HIGHLY ACTIVE THERMALLY STABLE NANOPOROUS GOLD CATALYST

(71) Applicant: Lawrence Livermore National Security, LLC, Livermore, CA (US)

(72) Inventors: Juergen Biener, San Leandro, CA (US); Arne Wittstock, Livermore, CA (US); Monika M. Biener, San Leandro, CA (US); Michael Bagge-Hansen, Livermore, CA (US); Marcus Baeumer, Bremen (DE); Andre Wichmann, Bremen (DE); Bjoern Neuman, Hamburg (DE)

(73) Assignee: Lawrence Livermore National Security, LLC, Livermore, CA (US)

( * ) Notice: Subject to any disclaimer, the term of this patent is extended or adjusted under 35 U.S.C. 154(b) by 964 days.

(21) Appl. No.: 16/509,366

(22) Filed: Jul. 11, 2019

(65) Prior Publication Data

US 2019/0336947 A1 Nov. 7, 2019

Related U.S. Application Data

(62) Division of application No. 15/331,712, filed on Oct. 21, 2016, now Pat. No. 10,406,507, which is a
(Continued)

(51) Int. Cl.
*B01J 23/10* (2006.01)
*B01J 37/08* (2006.01)
(Continued)

(52) U.S. Cl.
CPC ............ *B01J 23/66* (2013.01); *B01D 53/945* (2013.01); *B01J 21/063* (2013.01); *B01J 23/10* (2013.01);
(Continued)

(58) Field of Classification Search
CPC ... B01J 21/00; B01J 23/00; B01J 23/10; B01J 23/02; B01J 25/00; B01J 29/00;
(Continued)

(56) References Cited

U.S. PATENT DOCUMENTS 4,093,345 A * 6/1978 Logan ................... H01S 5/0265
372/45.01
4,959,257 A * 9/1990 Mukherjee .............. C03C 17/38
204/192.15
(Continued)

FOREIGN PATENT DOCUMENTS

WO WO-2012086697 A1 * 6/2012 ............. B82Y 30/00

OTHER PUBLICATIONS

Three-Dimensional Morphology of Nanoporous GOld, Fujita et al., Appl. Phys. Lett., 92, 251902(2008). (Year: 2008).*
(Continued)

*Primary Examiner* — James E McDonough
(74) *Attorney, Agent, or Firm* — Zilka-Kotab, P.C.

(57) ABSTRACT

In one embodiment, a product includes a nanoporous gold structure comprising a plurality of ligaments, and a plurality of oxide particles deposited on the nanoporous gold structure; the oxide particles are characterized by a crystalline phase.

19 Claims, 6 Drawing Sheets

Related U.S. Application Data division of application No. 13/918,738, filed on Jun. 14, 2013, now Pat. No. 9,522,387.

(60) Provisional application No. 61/660,549, filed on Jun. 15, 2012.

(51) Int. Cl.

| | | |
|---|---|---|
| *B01J 23/66* | (2006.01) | |
| *B01J 23/89* | (2006.01) | |
| *B01J 23/52* | (2006.01) | |
| *B01J 37/34* | (2006.01) | |
| *B01J 21/06* | (2006.01) | |
| *B01J 23/745* | (2006.01) | |
| *B01J 35/00* | (2006.01) | |
| *B01J 35/10* | (2006.01) | |
| *B01J 37/02* | (2006.01) | |
| *B82Y 30/00* | (2011.01) | |
| *B01D 53/94* | (2006.01) | |
| *B01D 53/88* | (2006.01) | |

(52) U.S. Cl.
CPC ............ *B01J 23/52* (2013.01); *B01J 23/745* (2013.01); *B01J 23/8906* (2013.01); *B01J 35/002* (2013.01); *B01J 35/004* (2013.01); *B01J 35/006* (2013.01); *B01J 35/0006* (2013.01); *B01J 35/0013* (2013.01); *B01J 35/1009* (2013.01); *B01J 35/1014* (2013.01); *B01J 35/1061* (2013.01); *B01J 37/0201* (2013.01); *B01J 37/0207* (2013.01); *B01J 37/0217* (2013.01); *B01J 37/0225* (2013.01); *B01J 37/08* (2013.01); *B01J 37/342* (2013.01); *B01J 37/349* (2013.01); *B82Y 30/00* (2013.01); *B01D 53/885* (2013.01); *B01D 2255/106* (2013.01); *B01D 2255/2065* (2013.01); *B01D 2255/2066* (2013.01); *B01D 2255/20707* (2013.01); *B01D 2255/40* (2013.01); *B01D 2255/802* (2013.01); *B01D 2255/9202* (2013.01); *B01D 2255/9207* (2013.01); *C01B 2203/044* (2013.01); *Y02T 10/12* (2013.01)

(58) Field of Classification Search
CPC .. B01J 21/063; B01J 35/0006; B01J 35/0013; B01J 35/002; B01J 35/1014; B01J 35/1061; B01J 37/0201; B01J 37/08
USPC ......................... 502/100, 300, 302, 304, 344
See application file for complete search history.

(56) References Cited

U.S. PATENT DOCUMENTS

| 5,827,415 | A | 10/1998 | Gur et al. |
|---|---|---|---|
| 9,522,387 | B2 | 12/2016 | Biener et al. |
| 10,406,507 | B2 | 9/2019 | Biener et al. |
| 2007/0224099 | A1 | 9/2007 | Biener et al. |
| 2010/0282613 | A1 | 11/2010 | Schuh et al. |
| 2013/0295461 | A1* | 11/2013 | Chen ................ H01M 4/80 429/223 |
| 2013/0337995 | A1 | 12/2013 | Biener et al. |
| 2017/0036194 | A1 | 2/2017 | Biener et al. |

OTHER PUBLICATIONS

Biener et al., "Effect of Surface Chemistry on the Stability of Gold Nanostructures," Langmuir Letter, vol. 26, No. 17, 2010, pp. 13736-13740.
Wichmann et al., "Maximizing Activity and Stability by Turning Gold Catalysis Upside Down: Oxide Particles on Nanoporous Gold,", pp. 1-14.
Biener et al., U.S. Appl. No. 13/918,738, filed Jun. 14, 2013.
Restriction Requirement from U.S. Appl. No. 13/918,738, dated Aug. 14, 2014.
Non-Final Office Action from U.S. Appl. No. 13/918,738, dated Apr. 22, 2015.
Final Office Action from U.S. Appl. No. 13/918,738, dated Apr. 22, 2016.
Notice of Allowance from U.S. Appl. No. 13/918,738, dated Aug. 11, 2016.
Fujita et al., "Three-Dimensional Morphology of Nanoporous Gold," Applied Physics Letters 92, Jun. 23, 2008, pp. 251902/1-251902/3.
Wichmann et al., "Maximizing Activity and Stability by Turning Gold Catalysis Upside Down: Oxide Particles on Nanoporous Gold," ChemCatChem 0000, 2013, pp. 1-8.
Biener et al., "ALD Functionalized Nanoporous Gold: Thermal Stability, Mechanical Properties, and Catalytic Activity," 2011 American Chemical SOCiety, Nano Letters, vol. 11, 2011, pp. 3085-3090.
Biener et al., "Nanoporous Plasmonic Metamaterials," Advanced Materials, vol. 20, 2008, pp. 1211-1217.
Wittstock et al., "Nanoporous Gold Catalysts for Selective Gas-Phase Oxidative Coupling of Methanol at Low Temperature," Science, vol. 327, Jan. 15, 2010, pp. 319-322.
Biener et al., U.S. Appl. No. 15/331,712, filed Oct. 21, 2016.
Restriction Requirement from U.S. Appl. No. 15/331,712, dated Jul. 20, 2018.
Non-Final Office Action from U.S. Appl. No. 15/331,712, dated Oct. 19, 2018.
Notice of Allowance from U.S. Appl. No. 15/331,712, dated May 7, 2019.

\* cited by examiner

HIGHLY ACTIVE THERMALLY STABLE NANOPOROUS GOLD CATALYST

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to catalysis, and more particularly to high-surface area catalysts having high activity and thermal stability over a broad temperature range.

BACKGROUND

Conventional gold-based catalysts, and particularly nanoporous gold-based catalysts either consist of the nanoporous gold material, or are formed by depositing gold on and/or within metal oxides to form an active structure. While these conventional structures exhibit beneficial activity at relatively low temperatures (e.g. about 0 centigrade), as temperature increases the activity degrades due to the nanoporous gold material forming aggregates (e.g. by sintering), reducing the surface area of the overall structure and thus the catalytic activity thereof.

This is particularly undesirable for use in applications to which such catalysts have been earnestly researched. In particular, for an engine (in particular an internal-combustion engine) that operates at a wide range of temperatures, a catalyst that could efficiently treat exhaust gas both in a cold-start phase and at a peak-operation phase when the engine is hot (e.g. several hundred centigrade) would be beneficial.

SUMMARY

In one embodiment, a product includes a nanoporous gold structure and a plurality of oxide particles deposited on the nanoporous gold structure. The oxide particles are characterized by a crystalline phase.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of high-surface area catalysts having high activity and thermal stability over a broad temperature range and/or methods of making the same.

In one general embodiment, a system includes a nanoporous gold structure and a plurality of oxide particles deposited on the nanoporous gold structure. The oxide particles are characterized by a crystalline phase.

In another general embodiment, a method includes depositing oxide nanoparticles on a nanoporous gold support to form an active structure and functionalizing the deposited oxide nanoparticles.

Figure 1A:
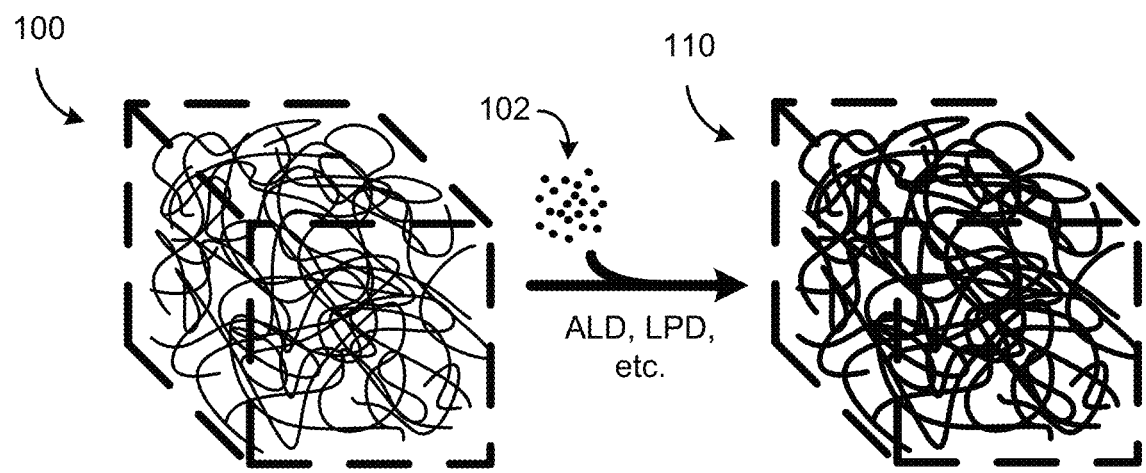
FIG. 1A depicts a simplified schematic of a nanoporous gold structure before and after having oxide particles deposited thereon, according to one embodiment.

Turning now to the Figures, FIG. 1A is a simplified schematic of a nanoporous gold (also referred to as "nanoporous Au" or "npAu") support before (100) and after (110) having deposited thereon a layer of oxide particles 102. Preferably the oxide particles 102 are deposited by a technique such as atomic layer deposition (ALD) or liquid phase deposition (LPD), and therefore exhibit physical characteristics of such deposition, including a highly conformal deposition on the nanoporous gold support. Of course, other deposition techniques may be utilized, as would be appreciated by one having ordinary skill in the art upon reading the present descriptions. Moreover, the oxide particles 102 may have already been functionalized, or may be awaiting subsequent functionalization, in various embodiments. The nanoporous gold support and deposited oxide particles may be pulverized after fabrication to produce a fine powder of the fabricated material. The powder may be particularly suited for use in fluid bed catalytic reactors, in some embodiments.

Figure 1B:
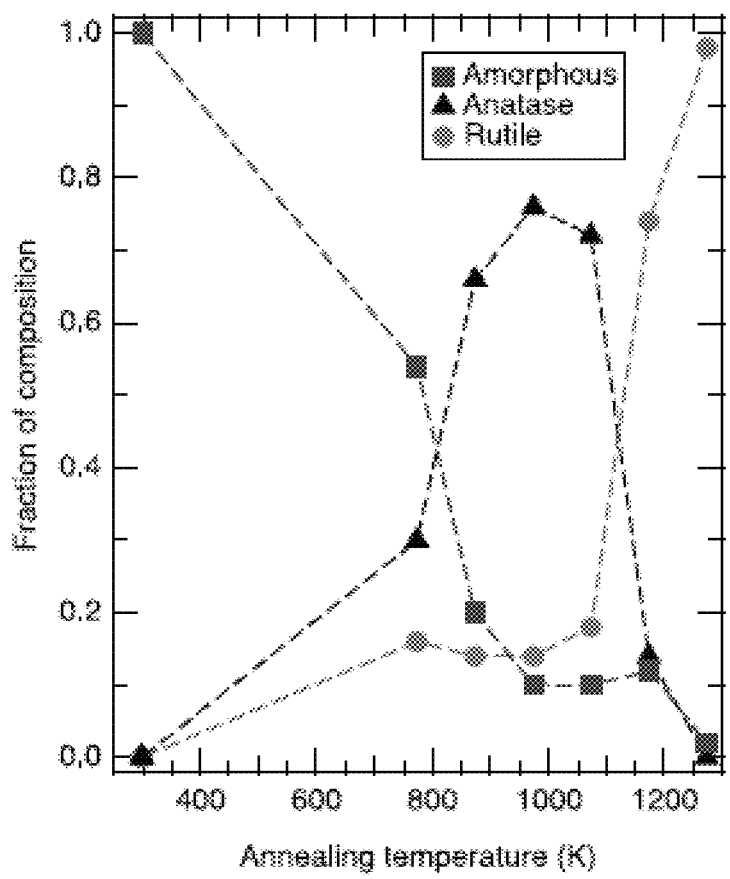
FIG. 1B depicts a relationship between annealing temperature and fraction of crystalline phase composition of a nanoporous gold structure having deposited thereon particles of titanium oxide, according to one embodiment.

FIG. 1B depicts the relationship between annealing temperature and crystalline phase for titanium oxide particles deposited on a nanoporous gold support, according to one embodiment. The data depicted in FIG. 1B will be described in further detail below in the "Experimental Data" section of this disclosure.

Figure 2A:
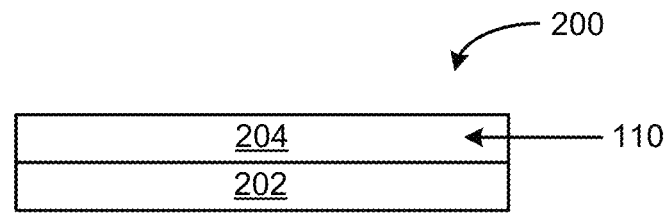
FIG. 2A is a simplified schematic of a nanoporous gold structure having deposited thereon oxide nanoparticles arranged as a thin film on a substrate, according to one embodiment.

FIG. 2A shows a simplified schematic of a thin-film catalyst system 200 comprising the nanoporous gold support and deposited, functionalized oxide particles as described herein, according to one embodiment. As shown in FIG. 2A, the thin-film catalyst system 200 comprises a substrate 202 and thin film 204 comprising the nanoporous gold structure having deposited thereon oxide particles functionalized for high catalytic activity over a broad temperature range (e.g. between 0 centigrade and 600 centigrade in some embodiments). The thin film 204 may optionally include one or more support components, as would be understood by one having ordinary skill in the art upon reading the present descriptions.

Figure 2B:
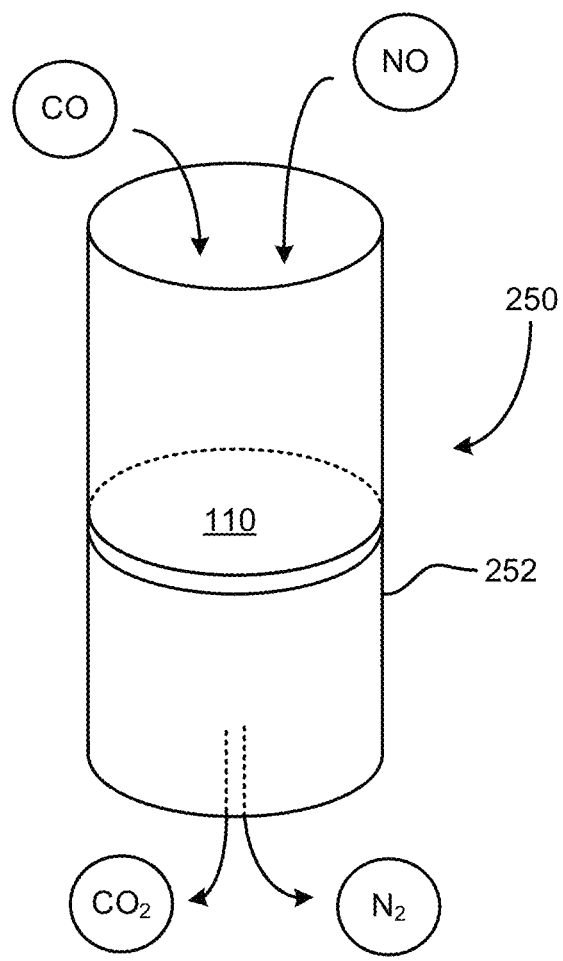
FIG. 2B is a simplified schematic of one embodiment of a cylindrical structure comprising a nanoporous gold structure having deposited thereon oxide particles, the structure being particularly configured for treatment of exhaust gas, according to one embodiment.

FIG. 2B is a simplified schematic of an exemplary exhaust gas treatment system 250 employing a monolithic catalyst comprising the nanoporous gold support and deposited, functionalized oxide particles as described herein. As shown, the system includes a cylindrical structure 252 such as a pipe having arranged therein a nanoporous gold structure 110 having deposited therein oxide particles characterized by a crystalline phase. Exhaust gas molecules such as carbon monoxide CO and/or nitrogen monoxide NO exit an exhaust gas source (not shown) coupled to the cylindrical structure 252, pass through the nanoporous gold structure 110, and some of those molecules are converted into carbon dioxide $CO_2$ or molecular nitrogen $N_2$, respectively, by virtue of the catalytic activity conferred by the nanoporous gold structure 110.

Various embodiments of the systems described above may include additional and/or alternative features, functions, and components, will now be detailed for illustrative purposes not intended to be limiting on the scope of this disclosure in any manner.

In one embodiment, a system includes a nanoporous gold structure; and a plurality of oxide particles deposited on the nanoporous gold structure in such a way that interfaces between the nanoporous gold structure and the oxide particles are available for catalytic activity. The oxide particles preferably have a crystalline phase conferring one or more of a high catalytic activity, a high photocatalytic activity, and a high lithium ion storage activity. More preferably, the average crystalline phase in the particles is greater than 75 vol % (with 25% or less amorphous content), more preferably greater than 90%, and ideally greater than 95%, and most ideally greater than 99%.

Figure 3:
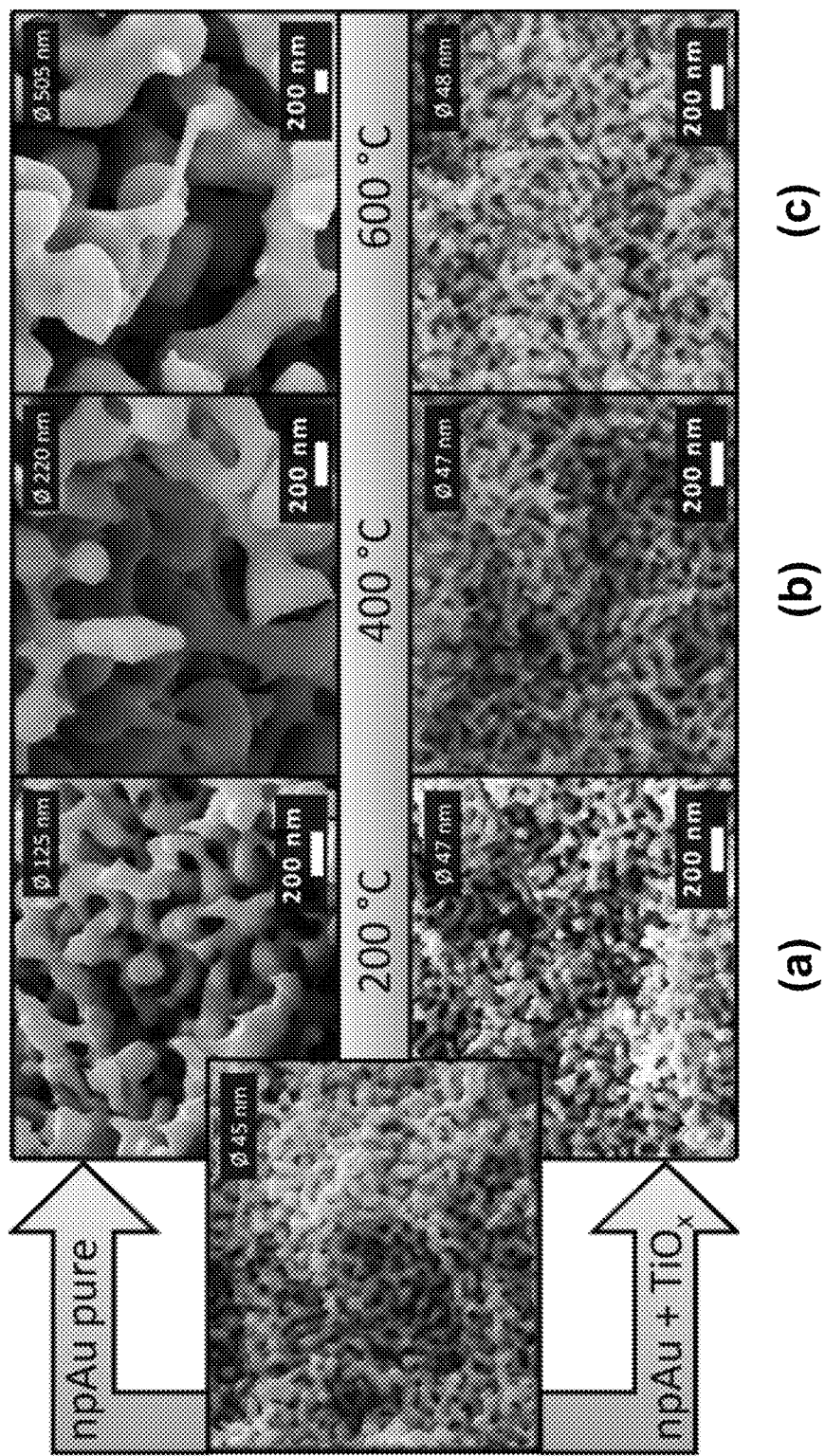
FIG. 3 depicts scanning electron micrographs of a pure nanoporous gold structure and a nanoporous gold structure having deposited thereon oxide particles at various temperatures, and the tendency of each structure to sinter at such temperatures, according to one embodiment.
Figure 4A:
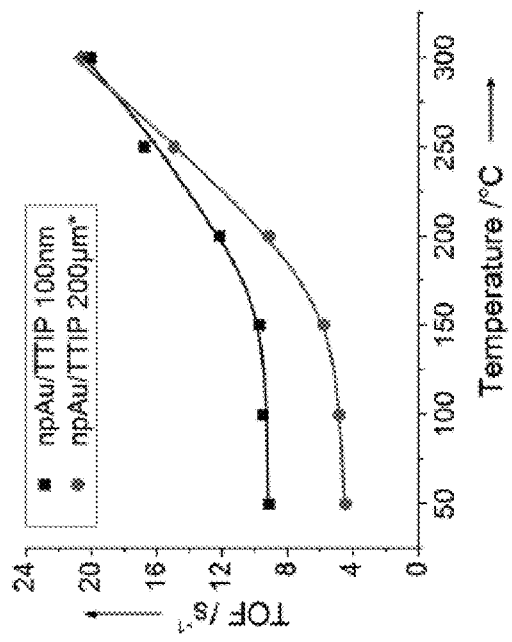
FIGS. 4A-4D illustrate various relationships between carbon-monoxide oxidation efficiency and temperature or carbon monoxide concentration, according to various embodiments.
Figure 4B:
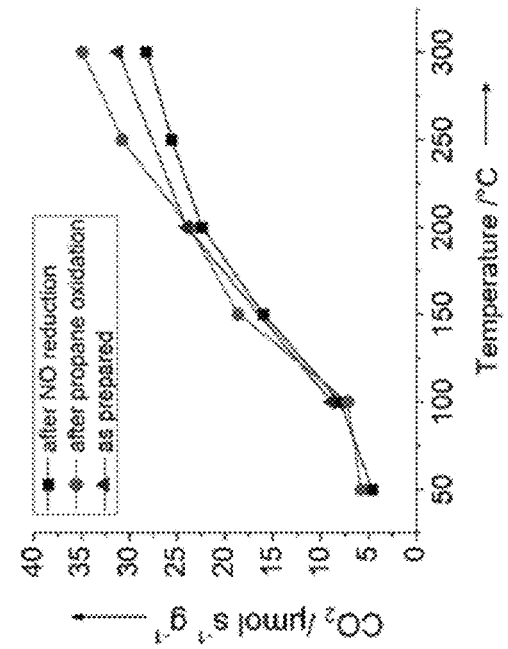
Figure 4C:
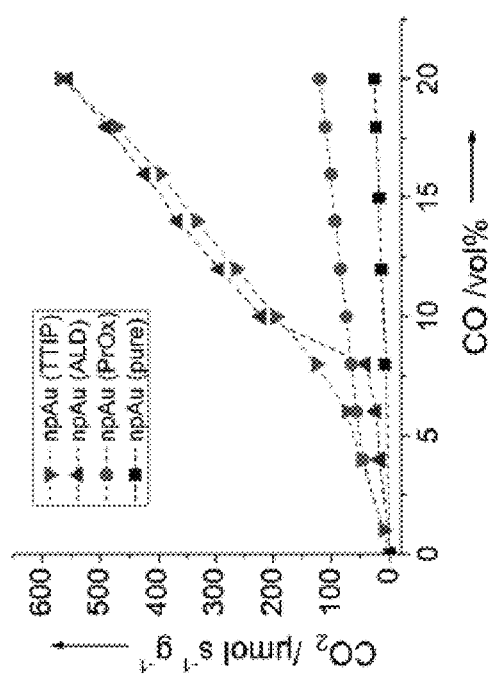
Figure 4D:
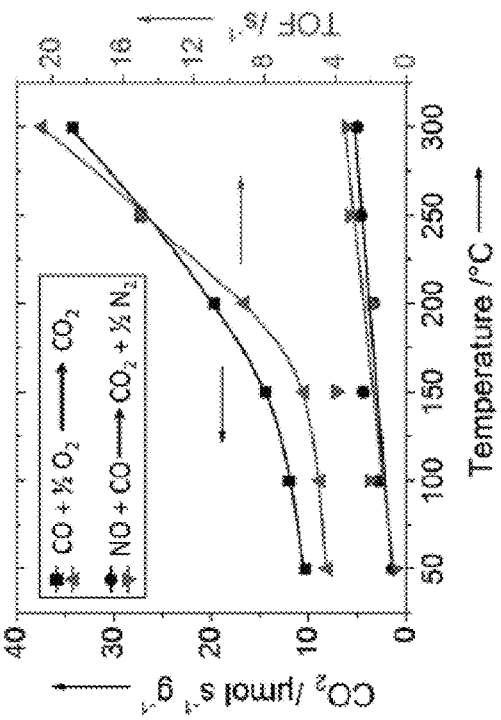

Moreover, in some embodiments the nanoporous gold structure comprises a plurality of ligaments (such as shown in FIGS. 1A and 3, for example). Preferably, Gold in the ligaments is resistant to sintering at temperatures up to about 600 C, i.e. ligaments do not form aggregates or increase in diameter at temperatures that cause sintering and aggregation of gold particles in pure gold nanoporous structures. While not wishing to be bound to any theory, the inventors propose the temperature stability is at least in part a result of the gold nanoparticles being spatially confined by the metal oxide particles having the preferred crystalline structure, thereby preventing atomic movement within the overall crystal structure that typically causes aggregation of larger particles in pure-gold nanoporous structures.

In some approaches, the ligaments are characterized by an average diameter in a range from about 25 nm to about 75 nm, in a preferred embodiment the ligaments have an average diameter of about 50 nm, which is stable to temperatures up to about 600 C.

Moreover, in various embodiments the ligaments define a plurality of nanopores having an average diameter in a range from about 10 nm to about 50 nm. The nanopores are preferably substantially distributed homogenously throughout the nanoporous gold structure, and the oxides are distributed throughout available nanopores of the nanoporous gold structure. Moreover, available nanopores are defined herein as nanopores being accessible to oxide particles via atomic layer deposition (ALD) and/or liquid phase deposition (LPD) processes.

Preferably, the oxide particles include one or more metal oxide(s) and/or precursor(s) thereof. Even more preferably, the metal oxides are selected from a group consisting of: a titanium oxide, including viable precursors thereof such as titanium isopropoxide (TTIP), a cerium oxide, a praseodymium oxide, including $Pr(NO_3)_3$, and an iron oxide. Most preferably, the metal oxides are selected from a group consisting of: a titanium oxide characterized by a predominantly anatase crystalline phase (where "predominantly" means at least 90% of the atoms in the material are in the recited crystalline phase); a cerium oxide characterized by a predominantly fluoride crystalline phase having oxygen vacancies; a praseodymium oxide characterized by a predominantly fluoride crystalline phase having oxygen vacancies; and an iron oxide characterized by a predominantly hematite crystalline phase.

Moreover, in some approaches the plurality of oxide particles have physical characteristics of being deposited by a process selected from: atomic layer deposition, liquid phase deposition, and wet chemical impregnation; and incubated at a predetermined temperature for a predetermined period of time sufficient to cause the oxide particles to have primarily (i.e., greater than 50%) a predetermined crystalline phase.

In one embodiment, the nanoporous gold structure is characterized by a high specific surface area in a range from about 5 $m^2/g$ to about 15 $m^2/g$.

In select embodiments, the system exhibits a carbon monoxide oxidation activity not less than a value in a range from about 5 $s^{-1}$ to about 20 $s^{-1}$.

Exemplary systems, in some embodiments, may also include one or more additional and/or alternative components such as a substrate, which may be any of a catalytic converter of an engine, walls of an exhaust vent or pipe, a screen or mesh, a frame etc. Moreover, some systems within the scope of these disclosures may feature the nanoporous gold structure and deposited oxide nanoparticles being arranged as a thin film deposited on and/or coupled to the substrate (such as shown in FIG. 2A). The thin film, in some embodiments, is characterized by a thickness in a range from about 100 nm to about 1 mm.

The systems described herein, in some approaches, may also be arranged as monolithic structures such as cubes, cylinders, spheres, etc., where the monolithic structure is characterized by a volume not less than about 1 $mm^3$.

FIG. 3 depicts scanning electron micrographs of a pure nanoporous gold structure and a nanoporous gold structure having deposited thereon oxide particles at various temperatures, and the tendency of each structure to sinter at such temperatures, respectively, according to one embodiment. The upper panels depict the pure nanoporous gold structure, while the lower panels depict the presently described structure at 200, 400 and 600 centigrade, respectively, for columns (a), (b) and (c), in one embodiment. As can be generally seen in FIG. 3, while the traditional pure nanoporous gold produces aggregates at temperatures as low as 200 centigrade, the presently described structures are characterized by thickening of ligand diameter by a mere one nanometer over a temperature range from 0 centigrade to 600 centigrade, as discussed in further detail below.

FIGS. 4A-4D illustrate various relationships between carbon-monoxide oxidation efficiency and temperature or carbon monoxide concentration, according to various embodiments.

Figure 5B:
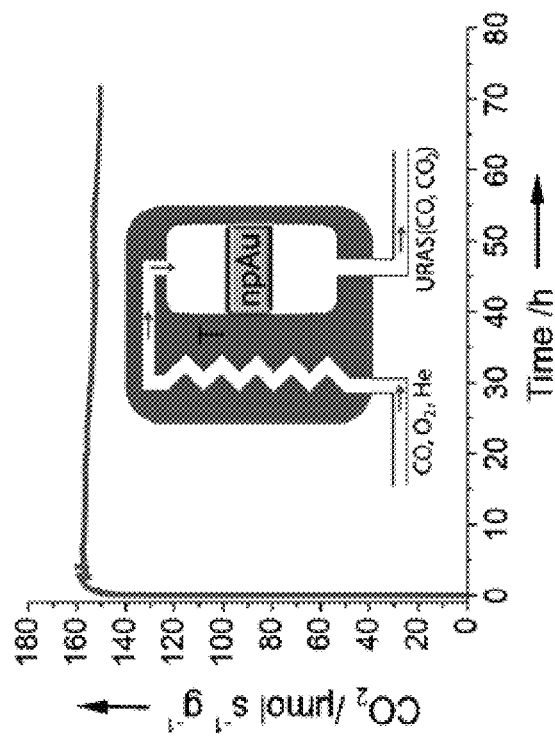
FIG. 5B shows a relationship between carbon monoxide oxidation activity and time for one embodiment of a nanoporous gold support structure having deposited thereon oxide particles.
Figure 5A:
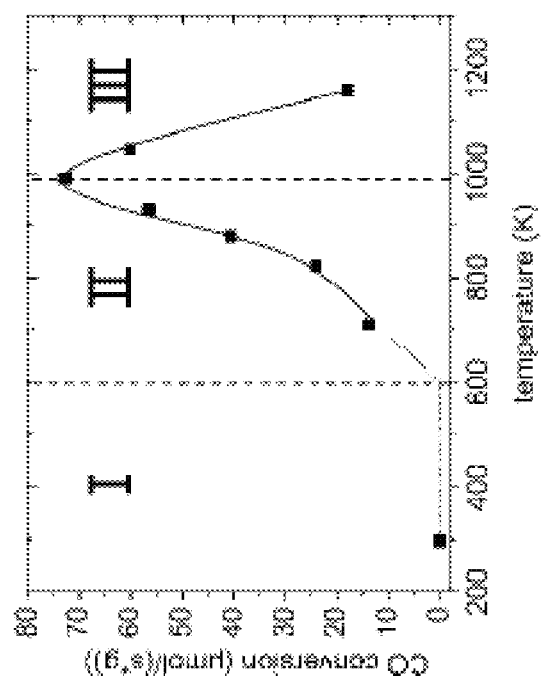
FIG. 5A shows a relationship between annealing temperature and carbon monoxide oxidation activity, according to one embodiment.

FIG. 5A shows a relationship between annealing temperature and carbon monoxide oxidation activity, according to one embodiment.

FIG. 5B shows a relationship between carbon monoxide oxidation activity and time for one embodiment of a nanoporous gold support structure having deposited thereon oxide particles.

The data depicted in FIGS. 3-5B will be described in further detail below in the "Experimental Data" section of this disclosure, according to various embodiments.

Figure 6:
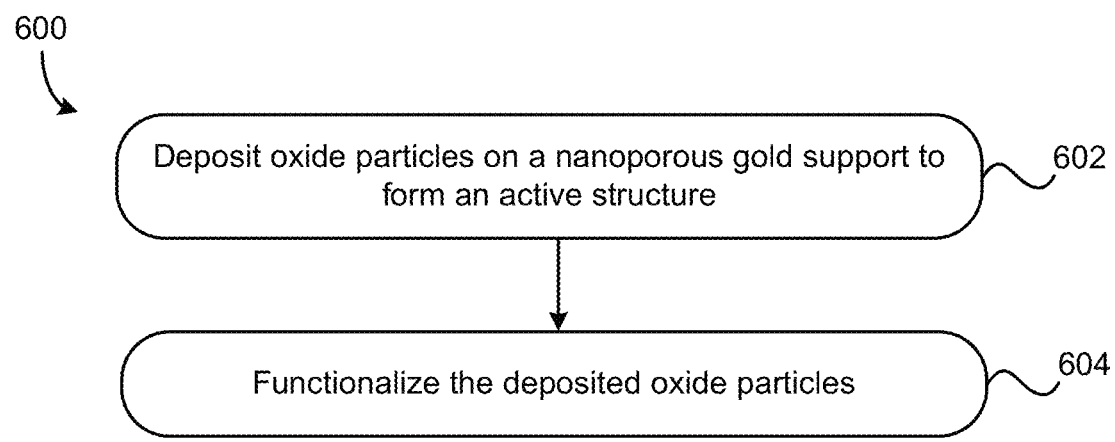
FIG. 6 is a flowchart of a method, according to one embodiment.

FIG. 6 is a flowchart of a method 600 for fabricating a nanoporous gold and functionalized oxide system commensurate in scope with the presently described inventive concepts, according to one embodiment. The method 600 may be performed in any suitable environment, including those shown in FIGS. 1-5, among others, in various approaches.

Method 600 includes operation 602, where oxide particles are deposited on a nanoporous gold support to form an active structure. Depositing the particles may be accomplished in any suitable manner that would be understood by one having ordinary skill in the art upon reading the present descriptions, but preferably includes a deposition technique capable of producing a highly conformal layer of particles deposited on the nanoporous gold support. In particularly preferred embodiments, the depositing comprises one or more of atomic layer deposition and liquid phase deposition.

Method 600 also includes operation 604, where the deposited oxide particles are functionalized. In various approaches, functionalization may include incubating the nanoporous gold support and deposited oxide particles at a predetermined temperature for a predetermined period of time. The predetermined temperature may vary according to the identity of the oxide, but generally should be sufficient to encourage atoms of the oxide to transition into and hold a predetermined crystalline phase. The predetermined crystalline phase may be particularly advantageous for the application to which the nanoporous gold support and deposited oxide particles are intended.

For example, if the oxide is titanium oxide, and the intended application is a redox application like exhaust gas treatment (e.g. CO oxidation/NO reduction), then the nanoporous gold support and deposited titanium oxide particles may be incubated to a temperature sufficient to encourage the titanium oxide to enter and maintain an anatase crystalline phase. In one embodiment, this entails incubating at a temperature of about 750 C for about one hour; in more embodiments the predetermined period of time is 2 hours and the predetermined temperature is 500 C (e.g. for an oxide comprising $Pr(NO_3)_3$), in more embodiments the predetermined period of time is 1 hour and the predetermined temperature is 750 C (e.g. for an oxide comprising $TiO_2$), in more embodiments.

More specifically, the functionalizing operation may include one or more of wet chemical leaching, annealing and/or calcination of the nanoporous gold structure and deposited oxide particles in an inert atmosphere, such as helium gas in one embodiment.

In various approaches, the method may include additional and/or alternative limitations and/or operations. For example, in some embodiments method 600 may include generating the nanoporous gold. Generating the nanoporous gold may include etching of a gold alloy to produce a nanoporous, substantially pure gold structure (a.k.a. foam or sponge). One example would be submersing the gold alloy in an acid that dissolves the non-gold portion(s) of the alloy by not the gold, thereby creating a nanoporous network throughout the resulting, nearly pure, gold structure. In one embodiment, the nanoporous gold structure includes at least 99% at % gold and has a porosity of at least 50% by volume or by weight, in alternative embodiments.

As a specific example, in one embodiment creating the nanoporous gold support comprises submersing the gold alloy in concentrated (e.g. >70 wt. %) nitric acid for at least 24 hours, preferably at least 48 hours. Of course, other acids, such as sulfuric acid, hydrochloric acid, acetic acid, etc. (as well as solvents different than acids) may be utilized in various different embodiments according to the identity of the element(s) to be removed from the gold alloy, as would be known to one having ordinary skill in the art upon reading the present descriptions.

Wet chemical etching may optionally include applying an electric potential to the gold alloy during the etching to facilitate precise control of features such as pore size, pore distribution, etc. as would be understood by one having ordinary skill in the art upon reading the present descriptions (e.g. via potentiostatic etching).

Nanoporous gold ("nanoporous Au" or "npAu") may be prepared using methods known in the art. Nanoporous Au can be prepared in the form of millimeter-sized monolithic samples by a process called 'dealloying.' In metallurgy, dealloying is defined as selective corrosion (removal) of the less noble constituent from an alloy, usually via dissolving this component in a corrosive environment. For example, nanoporous Au may be formed by selectively leaching silver (Ag) from an Ag—Au alloy using either a strong oxidizing acid such as nitric acid (free corrosion) or by applying an electrochemical driving force (electrochemically-driven dealloying). Both methods lead to the development of nanoporous open-cell morphology.

In the case of silver-gold (Ag—Au) alloys, this technique leads to the development of a three-dimensional bicontinuous nanoporous structure while maintaining the original shape of the alloy sample. Chemical analysis of the material reveals that almost pure Au may be achieved using this process.

Practical Applications

Embodiments of the present invention may be used in a wide variety of applications, and potentially any application in which high light yield and/or high resolution is useful.

Illustrative uses of various embodiments of the present invention include, but are not limited to, reduction-oxidation (redox) chemistry applications, gas treatment (particularly exhaust gas treatment for CO oxidation to $CO_2$ or NO reduction to $N_2$), energy-harvesting applications (e.g. photocatalytic cleavage of water), ion-storage applications (particularly lithium ion storage), etc.

EXPERIMENTAL DATA

Experiment 1

The following paragraphs detail experimental data gathered during the course of discovering and developing the presently disclosed inventive embodiments as described herein. The experimental data are provided by way of illustration to further exemplify the various aspects of the systems and methods detailed above, and are not to be considered limiting in any way on the scope of the instant disclosures.

Heterogeneous catalysis is a key technology not only with respect to the production of basic and advanced materials and chemicals but also with respect to the ever increasing energy and environmental concerns. Gold as a superior catalytic material was discovered about two decades ago and fueled intensive research efforts as it shows higher activity and better selectivity than any other precious metal, particularly at temperatures well below 100° C. Numerous studies under well-controlled conditions, such as high-vacuum conditions, revealed comprehensible reaction mechanisms rendering the surface chemistry of gold "predictable". This special feature of gold is the result of a "medium" interaction with adsorbates, enabling high activity at low temperatures and highly selective surface reactions.

For example, gold is more active than platinum for the aerobic oxidation of CO at 20° C. by four orders of magnitude. Gold catalysts can directly oxidize propylene to propylene oxide, with selectivity close to 100% in the absence of hydrogen peroxide; no such activity and selectivity are observed by platinum or palladium catalysts. Another intriguing example of gold's unique catalytic activity is the highly selective oxidation of alcohols, such as methanol, at temperatures as low as 20° C. This unique feature of gold is the result of a "medium" interaction with adsorbates, which also leverages a close correlation to model studies. The catalytic activity of gold at such mild conditions opens the door to various novel applications and has, for example, the potential to combat the cold-start period of the automotive converter. A major obstacle of gold in oxidation reactions is that the activation/dissociation of oxygen is greatly hindered on pure gold. Yet, gold nanoparticles dispersed on a suitable reducible metal oxide (e.g., titania or ceria) as a support material overcome this inherent impediment. In a recent publication, Green et al. show that the interface between the gold support and the metal oxide particle not only results in common adsorption sites for reactants, such as CO, but also enables the efficient activation of molecular oxygen. However, gold also demonstrates a low melting point (1063° C.) compared with other precious metals, such as platinum (1770° C.), which makes gold nanostructures thermally unstable and thus prone to deactivation. (Instead of the melting point, the semi-empirical Hüttig and Tammann temperatures ($T_{Hüttig}$=0.3 $T_{melting}$; $T_{Tammann}$=0.5 $T_{melting}$) can be considered, which describe the increasing mobility of atoms at defects and the resulting deactivation of the catalyst.) An ideal gold catalyst combines high activity at low temperatures (e.g., for the cold-start period); but, in an ideal case it is also stable at temperatures of several hundred degrees Celsius (e.g., during operation of an exhaust catalyst).

A simple solution to this problem is to reverse the classical situation, employing a catalytic system, comprised of metal-oxide nanoparticles on a high surface area gold support. As the melting temperature of metal oxides, such as titania, is nearly two times higher than that of gold, the corresponding metal oxide nanoparticles are considerably more stable against sintering. Such an approach, however, has not been considered so far in view of a lacking gold support. For instance, the idea of an inverse gold catalyst design was introduced in 2007 by Rodriguez et al. for studying the water-gas-shift reaction under ultra-high vacuum conditions. The focus of these model studies was the origin of the activity especially at the perimeter between the gold support and the metal oxide particle. Until now, however, it was just speculated if and how to transfer this inverse gold catalyst design into ambient pressure working conditions because a high-surface area gold support was missing.

An interesting material that fulfills the requirement of exhibiting a sufficiently high surface area is nanoporous gold ("npAu") which attracted increasing interest as a catalytic material only recently. This gold foam consists of interconnected gold ligaments and pores in the order of some tenths of nanometers, typically 30-40 nm, thus providing a high specific surface area in the range of 10 $m^2/g$. A particular advantage of this catalytic material is the stable monolithic structure, combining mechanical strength, thermal and electrical conductivity and a reproducible porosity due to self-organization during the preparation by corrosion (wet chemical leaching of Ag in an Ag-rich AuAg alloy) with or without potentiostatic control. This material can be prepared in various forms ranging from thin films suitable for coatings with thicknesses as thin as 100 nm, to millimeter sized pieces in the form of cylinders or cubes. The typical bicontinuous nanoporous structure emerges absolutely homogeneously during the preparation even for samples beyond the order of several millimeters. In summary, nanoporous gold appears to be an ideal basis for an inverse catalyst design, with far-reaching options to control structure (porosity) and surface chemistry.

In view of this potential, the following questions have been addressed in the current study: Can the scope of catalytic applications for npAu be expanded by combining it with metal oxides in an easy & reproducible fashion? In particular, in case of oxidation catalysis, can the activity be enhanced—even beyond anything achieved by classical catalyst designs so far—as anticipated by creating large interface areas between the gold support and the metal oxide particles? In addition, how can the nanostructure be conserved even at temperatures of several hundred degrees—being not accessible by classical gold nanoparticle catalysts at all? Also, will the according catalyst be active for a range of catalytic reactions, such as CO oxidation or NO reduction, which is particularly important in exhaust gas treatment already at low temperatures?

In search of a good partner for the nanoporous gold substrate, $TiO_2$ was chosen for several reasons. For instance, $TiO_2$ is the most investigated metal oxide for gold nanoparticle catalysts, resulting in highly active oxidation catalysts and is also an interesting material (combination) with respect to photo catalysis. The crucial impediment for conformal and reproducible deposition of surfactants onto the surface of highly porous nanomaterials such as npAu is the associated high aspect ratio of the pores, inducing mass transport limitation. Atomic layer deposition (ALD) which consists of self-limiting surface reactions of suitable precursors was shown to be superior to other vapor phase deposition techniques in this respect. Accordingly employed this technique was employed to generate conformal coatings of titania inside the npAu material as described in ref. However, to demonstrate the generality of this approach, wet chemical impregnation of npAu with a viable precursor (titanium isopropoxide, TTIP) may also be used followed by a subsequent calcination step generating metal oxide coatings inside the npAu structure.

Both techniques result in densely arranged metal oxide nanoparticles on the inner surface of the npAu material. While the TTIP impregnation method leads to particle growth right away, ALD results in closed films of approximately 2.5 nm, which however can be cracked up into particles by a subsequent heating step to 650° C. (At lower temperatures this transformation does not occur.) High resolution transmission electron microscopy (HR-TEM) reveal Au ligaments abundantly covered by approximately 5 nm to 10 nm $TiO_2$ particles. They also reveal that in case of the ALD coated samples besides finely dispersed nanoparticles $TiO_2$ films do still exist.

The development and application of $TiO_2$/metal hybrid materials, such as $TiO_2$/npAu, depends on the ability to control the crystallographic phase of the functional $TiO_2$ component. Besides being in an amorphous form, titania can exist in different crystallographic phases (anatase-rutile-brookite) with anatase being reported to be most beneficial with respect to catalytic activity. The formation of a particular crystallinity is dependent on the microstructure of the initially deposited metal oxide and the chosen temperature. The three crystalline phases of $TiO_2$ share the same structural motif of $TiO_6$ octahedra; though, they differ in how the $TiO_6$ units are connected to each other—and therefore the degree of distortion of the $TiO_6$ octahedra. In rutile, the $TiO_6$ units form edge connected $TiO_6$ ribbons while in anatase, each $TiO_6$ unit has four edge connections.

In order to obtain the favored crystalline anatase particles, the as-prepared amorphous metal-oxide coated npAu foam was heat treated at 400° C. for 60 min in case of liquid phase doping by TTIP and at 650° C. for 100 min in case of ALD modified disks, respectively. The higher temperature in the latter case is associated with the mentioned breakup of the initially closed layer of titania on the npAu surface which does not occur at temperatures below about 650° C. The crystallinity of the $TiO_2$ nanoparticles was studied by Raman spectroscopy and HR-TEM. The determination of the largest lattice fringe distance with HR-TEM proved that the crystalline nanoparticles indeed consist of anatase. For example, the 30 cycle $TiO_2$-coated ALD sample showed only the crystallographic anatase phase (signals are at 144, 397, 517, and 639 $cm^{-1}$) after the general activation process (annealing at 750° C. for 1 h); a contribution from a rutile phase (diamonds) was not detected, which implies that no or only minor concentration of this phase existed. The absence of any phonon excitation in the case of the as-prepared sample indicates that the initially deposited film is amorphous and gets transformed into the anatase phase during this activation process. The lattice plane of 0.36±0.01 nm is in a good agreement to the literature (0.35 nm) for {101} lattice planes of this phase.

The catalytic activity of pure and titania coated npAu samples for the aerobic oxidation of CO ($CO+\frac{1}{2}O_2 \rightarrow CO_2$) and the reduction of NO ($NO+CO \rightarrow \frac{1}{2}N_2+CO_2$) was measured in a continuous flow reactor at various temperatures, starting at reactor temperatures of 40° C. up to 300° C. and concentrations of 0.7 vol % for NO and 1-20 vol % for CO. The conversion of CO and NO proceeds at a temperature of 50° C. and increases with temperature In contrast, the CO conversion of the TiO2 coated foams increased with increasing temperature showing a steep jump of activity between 60° C. and 100° C. and subsequently increasing in a parabolic fashion indicating that mass transport (Knudsen Diffusion) in and out of the pores is rate limiting. The activity jump was always found in the same temperature range, independent of the preparation procedure (ALD or liquid TTIP impregnation), indicating a general behavior, such as a mechanistic change at this temperature. To emphasize, in comparison to the untreated npAu sample, the activity of metal oxide-coated samples for CO oxidation is increased by more than one order of magnitude when reactants are supplied in large quantities (>10 vol % CO and 30 vol % $O_2$ at 60° C.). The production of $CO_2$ increases linearly with the supply of CO, which indicates first-order reaction kinetics. Notably, both deposition methods—liquid phase impregnation with TTIP and ALD coating—achieved identical activities above a CO concentration of 10 vol %.

This finding is in good agreement with studies of the CO oxidation over gold nanoparticles deposited on titania supports, for which two mechanistic regimes with a transition around 50° C. were reported. (In the case of the TTIP impregnated sample, the activity jump was observed at somewhat higher temperatures of about 120° C. in the first run. This indicates an activation process of the surface most likely due to cleaning from adsorbed contaminations.) It is noteworthy that due to the monolithic and heat conductive structure of the npAu, the catalyst temperature was able to be directly measured, which as a consequence of the highly exothermic nature of the oxidation reaction is higher than the reactor temperature. On the one hand, this enables the direct assessment of the reactivity as a function of the catalyst temperature not being possible in a similar fashion with Au nanoparticles on an oxide support. On the other hand, it is important in the context of homogeneous and effective heat dissipation preventing over-heating being one main obstacle for the stability of gold nanoparticles so far.

As noted above, in comparison to the "pure" nanoporous gold sample (with residual silver helping to activate oxygen), the activity of the metal oxide coated samples is increased by more than one of order of magnitude in the temperature range above 60° C. Again, it is also noteworthy, that both deposition methods—TTIP liquid phase impregnation and the ALD coating—achieved identical activities above a CO concentration of 10 volume %. Of course, as shown in a previous study for pure npAu, due to the fine porosity of the deployed free standing npAu films the observable conversion is strongly limited by diffusion of the reactants into pores of the material. Taking this kind of mass transport limitation into account, a reaction rate can be calculated which is even a factor of 200 higher than for pure npAu.

For example, to enable a comparison of the activities observed for the inverse gold catalyst with deposited gold nanoparticles, the turnover frequency (TOF) may be calculated, which is the number of product molecules per active site and second [see Eq. (1)]. This number can be expressed by the total flow of gases, F; the fraction of product gas in the flow, a; the molar volume of an ideal gas, VM; the Avogadro constant N; and the total surface area of the catalytic material, w:

$$TOF = \frac{\text{Product Molecules}}{\text{Active site} \times \text{time}} = \frac{F_a}{V_M N_W} \quad (1)$$

In comparison to the 200 mm thick free standing membranes containing pores with an aspect ratio of approximately 7000, 100 nm thick $TiO_2$-npAu film coatings (made from a 9 carat American white gold leaf) with a pore aspect ratio of as low as 3 were measured. In the former case, mass transport within the pores affect the observable reaction rate, whereas in the latter case, mass transport limitation should be negligible.

Activities in a comparable regime are obtained for both sample geometries by correcting the TOFs of the disk for mass transport limitation by applying the so-called Thiele modulus formalism. This confirms the same intrinsic catalytic activity of both forms of the catalyst.

The activity of the TiO$_2$-coated catalyst expressed as TOF at low temperatures is approximately 5 s$^{-1}$, which exceeds that of gold particle systems and increases in an exponential fashion with temperature, finally reaching approximately 20 s$^{-1}$ at 300° C. The activity for NO reduction is slightly lower, which starts at approximately 0.6 s$^{-1}$ at 50° C. and increases to 3 s$^{-1}$ at 300° C.

The stability of the catalyst with respect to poisoning or permanent loss of activity after NO reduction as well as exposure to hydrocarbons was investigated by consecutively measuring the activity of samples for the oxidation of CO after particular experiments. In the case of NO reduction, the catalyst showed constant activity over at least 2 h. Although the activity for CO oxidation faded after this NO load, the catalyst fully regained its initial activity after treatment at 500° C. for 30 min (in the case of its use as an exhaust catalyst, after reaching the operating temperature). In the case of exposure to hydrocarbons, such as propane, at 300° C. for 45 min, the catalyst preserved its initial activity. No permanent loss of activity or indication of poisoning of the catalyst surface was observed.

In search of other oxide partners for the nanoporous gold substrate enhancing its oxidation capabilities, praseodymia (PrO$_x$) was also studied. Praseodymia is a less common support, but it is known for its rich redox chemistry. In contrast to titania, a simpler preparation approach was chosen. As in the case of titanium dioxide, a npAu disk was modified with PrOx nanoparticles in this case by using liquid phase impregnation. For instance, a Pr(NO$_3$)$_3$/ethanol (20 g/L) solution was used for the impregnation carried out for 15 minutes. After drying, the sample was heated (calcined) in air to 500° C. (7.3° C./min heating rate). The activity of such samples for CO oxidation was somewhat lower than that for titania (factor of 5); this lower performance might be due to the less efficient coating, as revealed by the SEM results. In spite of this, also for praseodymia the activity increase is remarkable (by factor of 4.5 as compared to the pure npAu; activity of the PrO$_x$-npAu sample), underlining the generality of the approach to boost the activity of npAu by oxide nanoparticles.

The fact that the activity increases with increasing temperature while it decreases for pure npAu due to coarsening of the ligaments, already implies that not only the activity, but also the thermal stability is drastically improved. Indeed, SEM studies revealed that, while the ligament size of the pure npAu is drastically increased upon annealing, the metal oxide deposits lead to a complete stabilization of the structure. The starting ligament size (after preparation under the conditions mentioned in this Experimental Section) of the npAu is approximately 40 nm. By annealing to 400° C., the ligament size increases to a value of 220 nm and on heating to 600° C. to a value of 500 nm. Converting mesopores to macropores (40-500 nm) in a continuous manner is thus feasible (Notably, the gold ligament size as a function of temperature follows an exponential trend).

This suppression of coarsening can most likely be explained by pinning of Au surface atoms, especially at step edges, resulting in a reduction of the surface self diffusivity of Au. The original npAu structure could be conserved up to temperatures as high as 600° C. after functionalization. In accordance with this observation, the catalytic activity of the metal oxide/npAu composite is stable at these elevated temperatures as well. Even in the case of continuous operation (CO oxidation) at 250° C. and high CO concentrations of 12 vol % for more than 72 h, the loss of activity was merely 4%. Whereas full stabilization of the nanoporous structure along the whole cross section was achieved after TiO$_2$ deposition with ALD and TTIP respectively, in the case of praseodymia, coarsening was suppressed within a layer of 10-15 µm close to the outer surface upon heating to 500° C. Below this layer, a bimodal distribution of stabilized and destabilized areas was observed being probably the result of a limited penetration of the precursors into the narrow and tortuous pores of the material.

For the samples used in this study, such an incomplete deposition is not of importance, since the very inner sections of the sample do not considerably contribute to the catalytic activity due to mass transport limitation; see above. The virtually same conversion of CO for the ALD and TTIP coated samples is a consequence of the reduced concentration of reactants in these inner sections and thus limited contribution to the overall conversion of CO. Apart from a monolithic samples, free standing films or coatings with thicknesses below 1 µm can however be realized by using gold leafs, in all cases with well-defined and reproducible pore structures. Furthermore, applying suitable templating techniques, the relative density (fraction of actual gold per volume) can be reduced from 30 percent for typical free standing films down to 2 percent. Using such thin-walled materials, mass transport limitation can be avoided and the amount of gold material to be used can be minimized, shifting it into the regime of supported catalysts, yet, still having a stable nanostructured corpus.

To highlight, with regard to the experimental study of the samples discussed herein, it has been shown that the activity and temperature stability of gold catalysts can be dramatically improved by turning the classical order of the metal particle and the support upside down. In particular, the gold catalyst design presented herein results in considerably improved temperature stability in conjunction with very high catalytic activity owing to high areal density of oxide particles and thus a maximized interface area. Moreover, two techniques—ALD and liquid phase impregnation—both result in a controlled and homogeneous deposition of metal oxide particles, such as TiO$_2$ or PrO$_x$, within the nanoporous gold structure. The resulting catalyst is highly active for CO oxidation and NO reduction starting at temperatures of 50° C.; yet, it can be operated continuously at temperatures of several hundred degrees Celsius (>250° C.) without loss of activity.

Aside from 200- to 300 mm thick free-standing membranes, 100 nm thick TiO$_2$-npAu film coatings were also investigated, leading to the determination that the intrinsic activity of the samples in terms of turnover frequency is independent of the sample dimensions. This allows for a directed material design with respect to the monetary invest of the precious catalytic material as well as an optimized mass transport within the porous material. For example, the monetary investment for such 100 nm thin coatings is of the order of 1 cent per cm$^{-2}$ and less, which makes extended coatings economically viable (assuming a price of $50 g$_{Au}^{-1}$). Another approach is the application of suitable templating techniques, by which the relative density (fraction of actual gold per volume) of larger bulk samples can be reduced from 30% for typical freestanding films down to 2%. Thus, the used gold material can be shifted to and below the regime of gold particle catalysts, while keeping the stable nanostructured gold corpus.

Both, the significantly improved temperature stability in conjunction with the very high catalytic activity open the door for high temperature applications, such as exhaust gas catalysis. Very recent developments show that gold can be indeed employed in commercial emission control devices as diesel car catalyst (NS Gold™ by Nanostellar Inc.), underlining the potential of gold's commercialization. In our study using this new type of gold based catalyst (TTIP coated gold foam), no loss of activity during continuous operation at 250° C. and high CO concentrations of 12 Vol % was detected over 24 hours.

With regard to the preparation of the catalysts discussed above, unless stated otherwise, npAu samples shaped as disks with a diameter of 5 mm and a thickness of 200-300 mm were used, prepared by etching Ag—Au alloys with concentrated nitric acid (48 h, $HNO_3$, 70 wt %, OmniTrace Ultra, EMD Chemicals). The residual silver content after the dealloying process was below 1 at % (confirmed by atomic absorption spectroscopy). In addition, 100 nm thick npAu coatings were prepared from a 9 carat American white gold leaf. These thin sheets were floated on the surface of $HNO_3$ for approximately 5 min. After repeatedly transferring the films onto water for rinsing, they were transferred onto glass slides as coating.

In addition, the modification of samples with metal oxides ($TiO_2$ and $PrO_x$) was performed after the preparation of npAu samples. In the case of liquid phase impregnation, the samples were submersed into a precursor solution, TTIP (Sigma-Aldrich, 97% purity), and $Pr(NO_3)_3$ (Sigma-Aldrich, 99.9%, 20 $gL^{-1}$ suspension in ethanol) for 15 min After drying in air, the samples were annealed/calcined in He at 400° C. in the case of TTIP and 500° C. in the case of $Pr(NO_3)_3$ for 2 h. For the ALD of samples with $TiO_2$, the well-established titanium tetrachloride process ($TiCl_4/H_2O$) in a warm wall reactor (wall and stage heated to 110° C.) was used. To accommodate the high aspect ratio of the nanopores of the material, long purge, pulse, and pump times of 90 s were used. The deposition rate was adjusted by the number of pulse and purge/pump cycles.

Raman spectra were collected with a Nicolet Almega XR dispersive micro-Raman spectrometer with 633 nm excitation length and 100× collection objective (i.e., ~1 mm spot size).

The catalytic experiments were performed with two types of continuous flow reactors (steady-state fixed-bed turbular flow reactors). One reactor was specifically designed for low-temperature experiments. For measurements above 150° C., a vertically aligned tube reactor inside a tube furnace was used. The sample was placed on quartz wool, and the reactor temperature was measured with a thermocouple placed approximately 2 cm above the sample inside the reactor. For CO oxidation measurements, the feed gases consisted of a mixture of CO (Linde AG, 4.7), He (Linde AG, 5.0), and $O_2$ (Linde AG, 4.5). For NO reduction measurements, the feed gases consisted of a NO test gas mixture (Linde AG, category 1, 2% NO in Ar), CO (Linde AG, 4.7), and He (Linde AG, 5.0) as a carrier. The total flow of gases was set to 50 $mLmin^{-1}$ (standard conditions). The composition was precisely controlled with mass flow controllers (Bronkhorst Maettig). The stream of gases at the exit of the reactor was monitored online by IR gas analyzers (URAS 10E, Hartmann and Braun) operating at a fixed wavelength (highly sensitive for CO and $CO_2$).

Experiment 2

In additional experiments, Synchrotron-based near-edge x-ray absorption fine structure (NEXAFS) spectroscopy was used to characterize and quantify the phase composition of $TiO_2$ ALD thin films used in the functionalization of bulk nanoporous materials. (NEXAFS) spectroscopy is an element specific technique that is both very sensitive to changes in the local bonding environment and can be readily applied to samples containing only trace quantities. Moreover, the Ti NEXAFS $L_{2,3}$-edge is well known to exhibit exceptional sensitivity to Ti coordination and structure. For example, amorphous $TiO_2$ and anatase and rutile polymorphs of $TiO_2$ can be clearly distinguished by comparison of both peak positions and line-shape, especially in the fine structure of the $e_g$-band of the $L_3$-edge.

Accordingly, with the use of (NEXAFS) spectroscopy, variations in the catalytic activity of TiO2/npAu with post-ALD annealing were observed. The as-deposited ALD $TiO_2$ is amorphous; however, annealing to temperatures <1300 K induces controlled recrystallization and thus the ability to specify the predominant $TiO_2$ phase on the npAu support. NEXAFS and cross-sectional scanning electron microscopy (xSEM) provided unprecedented resolution for the systematic study of these changes in morphology and $TiO_2$ phase composition. Aerobic CO oxidation of annealed $TiO_2$/npAu samples was used as a model reaction to explore the relationship between observed variation in catalytic activity and annealing induced morphology and phase changes.

With regard to the preparation of samples, disk-shaped samples of npAu (diameter ~5 mm, thickness 200-300 microns) with a porosity of ~70% were prepared by selective dissolution (dealloying) of $Ag_{0.7}Au_{0.3}$ alloy samples in concentrated nitric acid (48 hrs, ~65 wt % $HNO_3$) as previously described. The as-prepared material has an average ligament diameter of ~50 nm (determined by geometrical evaluation) and a specific surface area of ~3.6 m2/g. Approximately 2 nm (+/−XX) thick amorphous $TiO_2$ films were deposited by 30 cycles of the titanium tetrachloride/water ($TiCl_4/H_2O$) ALD process in a warm wall reactor (wall and stage temperature of 383 K). Long pulse, pump and purge times (90 s each) were used to ensure uniform coatings throughout the porous material; the chamber was isolated from the vacuum line during dosing. The growth rate per cycle (0.07 nm/cycle) was calculated from the measured mass gain and the known surface area of npAu.

The effects of post-ALD annealing at 773-1273 K on phase composition and morphology of the $TiO_2$/npAu hybrid material was assessed by total electron yield (TEY) near-edge x-ray absorption fine structure (NEXAFS) and cross sectional scanning electron microscopy (xSEM), respectively. The Ti $L_{2,3}$-edge (455-470 eV) NEXAFS measurements were performed at beamline 8.0.1 of the Advanced Light Source, LBNL using an angle of incidence of ~45°. The data were normalized to the incident x-ray flux (measured simultaneously using the drain current to an upstream gold-coated absorbance between ~455 and 470 eV. Integrated intensity was used to isolate consideration of subtle higher energy peaks reported in the 469 to 482 eV range that occur above the primary resonances in a regime typically preferred for step edge normalization. The overall intensity had much less impact on the analysis than line-shape and peak positions. Nonetheless, normalization to the integrated intensity provided the most consistent output. Reference samples of rutile and anatase $TiO_2$ (powder, 99.95%, Sigma Aldrich) were measured and correlated with literature values.

The catalytic experiments were performed in a continuous flow, vertically aligned tube reactor surrounded by a tube furnace. The samples were placed on quartz wool and the temperature was measured by a thermocouple placed near the sample inside the reactor. Initial activation was performed by loading the $TiO_2$/npAu samples into the preheated reactor purged with synthetic air (Linde AG, 20% $O_2$, balance $N_2$). After annealing for 60 min, the samples were removed from the hot reactor for rapid cooling. Catalytic activity for CO oxidation of the annealed TiO$_2$/npAu samples was then measured using a feed gas mixture of 12 vol % CO (Linde AG, 4.7) and 30 vol % O$_2$ (Linde AG, 4.5) in He (Linde AG 5.0) at total gas flow of 50 ml min-1 (He balanced). The gas flow was controlled by mass flow controllers (Bronkhorst Maettig), and the CO/CO$_2$ product ratio was measured with online gas analyzers (URAS 10E Hartmann and Braun).

The effect of post-deposition annealing on the morphology of the TiO$_2$/npAu hybrid material was monitored. As previously reported, after 30 cycles of TiO$_2$ ALD at 383 K, the surface of npAu is coated with a conformal, ~2-nm-thick, continuous TiO$_2$ thin film. Annealing up to 873 K only slightly increases the characteristic feature size of npAu as the TiO$_2$ film suppresses Ostwald ripening of the Au ligaments that is typically observed through stress-assisted surface diffusion. At ~873 K, the initially continuous TiO$_2$ thin film breaks up into highly dispersed nanoparticles, thus exposing bare Au surface along the npAu ligaments. Once this happens, the Au ligaments of TiO$_2$/npAu start to coarsen, yet the rate of coarsening is not as fast as observed in uncoated npAu due to step-edge pinning by TiO$_2$.

Annealing induced TiO$_2$ phase changes in the ALD thin film were monitored by NEXAFS. Quantitative phase composition was obtained by applying the so-called "building block" interpretation of NEXAFS that involves fitting of the Ti L$_{2,3}$-edge NEXAFS spectra to linear combinations of Ti L$_{2,3}$-edge spectra obtained from amorphous TiO$_2$, anatase, and rutile. The validity of this approach relies on the following assumptions: (1) Ti L$_{2,3}$-edge spectra of TiO$_2$ polymorphs are sufficiently distinct to merit analysis of mixed phase samples by separation of the superimposed components, (2) amorphous, anatase, and rutile phases form a sufficient basis set, with no motivation to infer the presence of other phases (see supporting information), (3) stoichiometry is preserved, and (4) morphology changes associated with recrystallization of the thin film do not strongly affect the volume probed by NEXAFS. A chi-square minimization algorithm was implemented to select the best fit. Across the sample series, the linear combination fits are remarkably well correlated with the acquired Ti L$_{2,3}$-edge spectra (despite the constraints of the above assumptions), providing confidence that this approach captures the relative changes in composition. Further, results differ by no more than 5% in the intermediate temperatures whether initial spectra were normalized to the step edge or overall peak intensity.

The analysis reveals that already at 773 K almost half of initially present amorphous TiO$_2$ film is converted to anatase and some rutile. For comparison, amorphous TiO$_2$ gels start to crystallize to anatase at 643 K. The anatase content increases with further increasing annealing temperature until the maximum anatase content (~75%) is reached at ~973 K. The rutile content, on the other hand, stays roughly constant at 15-20% between 773 and 1073 K. At 1173 K and above, rutile suddenly becomes the predominant phase as the anatase component rapidly diminishes. This suggests that, at these higher annealing temperatures rutile supplants anatase as the most thermodynamically stable configuration, in agreement with the bulk phase diagram. It is interesting to note that while 90% of the initially present amorphous phase crystallizes at or below 973 K, the remaining 10% persist crystallization up to 1175 K where rapid conversion from anatase to rutile is observed. The crystallization persistent faction of the amorphous TiO$_2$ may thus be related to interfacial or intergranular material. Surprisingly, the presence of TiO$_2$ was not detected by standard XRD analysis, thus underlining the superior sensitivity of NEXAFS.

These observations are consistent with the reported size dependent thermodynamic stabilities of anatase and rutile that are caused by the very different surface enthalpies of these two TiO$_2$ phases. While rutile represents the thermodynamically most stable bulk phase of TiO$_2$, anatase crystallites smaller than ~14 nm are stabilized by the lower surface enthalpy of this phase. At higher annealing temperatures, as the TiO$_2$ nanocrystallites grow through Ostwald ripening, the lower surface enthalpy of anatase starts to lose its stabilizing effect, and the rutile becomes the thermodynamically more stable phase. Coarsening-induced anatase to rutile phase transformations are typically observed in the 900-1100 K regime.

The observation of ~15% rutile phase after only annealing to 773 K may thus be associated with the largest crystallites in the tail of the TiO$_2$ crystallite size distribution. New crystals formed in the annealing regime of 773 to ~1000 K, probably start small and thus are preferentially anatase. As they grow in size and decrease in number with increasing annealing temperature they start to be transformed into rutile.

The annealing induced morphology and phase changes discussed above dramatically affect the catalytic activity of the TiO$_2$/npAu hybrid material. Again, as noted above, the aerobic CO oxidation (CO+½ O$_2$→CO$_2$) serves as a model reaction to explore the relationship between observed variation in catalytic activity and annealing induced morphology and phase changes. Three distinct regions are observed with different effect of the annealing temperature on catalytic performance: (I) the low temperature region defined an inactive sample, (II) the mid temperature region from 600 to 1000 K with increasing activity, and (III) the high temperature region above 1000 K with loss of activity.

In region (I), for annealing temperatures below 700 K, no catalytic activity was observed. This is in contrast to untreated npAu that is catalytically active. As suggested by previous experiments under similar conditions, TiO$_2$ ALD leads to the formation of continuous coatings that completely cover the surface of the Au ligaments. Bulk titania, however, is inactive for the aerobic oxidation of CO, although very thin (few monolayers) oxide films on metal substrates can become catalytically active in the presence of SMSI (strong metal support interaction) effects. The inactivity of samples annealed in the low temperature regime therefore further verifies that the as-deposited ~2 nm thick (30 cycles) TiO$_2$ ALD films are continuous in nature and SMSI effects are not present.

In region (II), the TiO$_2$/npAu hybrid material becomes catalytically active and the activity increases with increasing annealing temperature. This may be attributed to two simultaneously occurring processes. First, the initially continuous TiO$_2$ film breaks up which results in the exposure of the Au/TiO$_2$ interface at the periphery of each TiO$_2$ crystallite. Second, the fraction of anatase rapidly increases with increasing annealing temperature, from ~30% at 800 K to ~80% at 1000 K. The maximum activity of 75 µmol CO s$^{-1}$ g$^{-1}$ is reached at 1030 K which coincides with the maximum fraction of anatase. Note that the catalytic activity does not correlate with the specific surface area of the npAu support, which decreases with increasing annealing temperature.

For annealing temperatures above 1000 K (region III), the trend reverses and the catalytic activity starts to rapidly decrease with increasing annealing temperature. The loss of activity in this temperature regime is accompanied by rapid conversion from anatase to rutile, and loss of active surface area due to continued coarsening of the structure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
   a nanoporous gold structure comprising a plurality of ligaments; and
   a plurality of oxide particles in a conformal layer covering the ligaments of the nanoporous gold structure throughout nanopores of the nanoporous gold structure,
   wherein the oxide particles include a metal oxide selected from a group consisting of: a titanium oxide, a cerium oxide, a praseodymium oxide, and precursors thereof,
   wherein the conformal layer surrounds the ligaments and has about a uniform thickness throughout the nanoporous gold structure,
   wherein the oxide particles are characterized by a crystalline phase.

2. The product as recited in claim 1,
   wherein the gold in the ligaments is resistant to sintering at temperatures up to about 600 C.

3. The product as recited in claim 1, wherein the ligaments are characterized by an average diameter in a range from about 25 nm to about 75 nm.

4. The product as recited in claim 1, wherein the ligaments define a plurality of nanopores having an average diameter in a range from about 10 nm to about 50 nm.

5. The product as recited in claim 4, wherein the nanopores are homogenously distributed throughout the nanoporous gold structure, wherein the oxide particles are distributed throughout available nanopores of the nanoporous gold structure.

6. The product as recited in claim 1, wherein the oxide particles include a metal oxide selected from a group consisting of: a titanium oxide, a cerium oxide, a praseodymium oxide, and precursors thereof.

7. The product as recited in claim 1, wherein at least 95 vol % of the oxide particles are characterized by the crystalline phase.

8. A product, comprising:
   a nanoporous gold structure comprising a plurality of ligaments; and
   a plurality of oxide particles in a conformal layer covering the ligaments of the nanoporous gold structure throughout nanopores of the nanoporous gold structure,
   wherein the conformal layer surrounds the ligaments and has about a uniform thickness throughout the nanoporous gold structure,
   wherein the oxide particles are characterized by a crystalline phase,
   wherein the oxide particles comprise one or more metal oxides selected from a group consisting of: a titanium oxide characterized by a predominantly anatase crystalline phase; a cerium oxide characterized by a predominantly fluoride crystalline phase having oxygen vacancies; a praseodymium oxide characterized by a predominantly fluoride crystalline phase having oxygen vacancies; and an iron oxide characterized by a predominantly hematite crystalline phase.

9. A product, comprising:
   a nanoporous gold structure comprising a plurality of ligaments; and
   a plurality of oxide particles deposited on the nanoporous gold structure,
   wherein the oxide particles include a metal oxide selected from a group consisting of: a titanium oxide, a cerium oxide, a praseodymium oxide, and precursors thereof,
   wherein the oxide particles are characterized by a crystalline phase,
   wherein the plurality of oxide particles have physical characteristics of being:
      in the form of a conformal, continuous layer extending throughout the nanoporous gold structure and surrounding the ligaments on all sides thereof; and
      incubated at a selected temperature for a period of time sufficient to cause the oxide particles to have primarily a predetermined crystalline phase.

10. The product as recited in claim 1, wherein the nanoporous gold structure is characterized by a high specific surface area in a range from about 5 $m^2/g$ to about 15 $m^2/g$.

11. The product as recited in claim 1, wherein the product exhibits a carbon monoxide oxidation activity not less than a value in a range from about 5 $s^{-1}$ to about 20 $s^{-1}$.

12. The product as recited in claim 1, further comprising:
    a substrate;
    wherein the nanoporous gold structure and deposited oxide nanoparticles are arranged as a thin film deposited on and/or coupled to the substrate; and
    wherein the thin film is characterized by a thickness in a range from about 100 nm to about 1 mm.

13. A three dimensional structure comprising the nanoporous gold structure and deposited oxide nanoparticles as recited in claim 1, wherein the three dimensional structure is characterized by a volume not less than about 1 $mm^3$.

14. The product as recited in claim 2, wherein the ligaments define a plurality of nanopores of the nanoporous gold structure, wherein the nanopores are distributed throughout the nanoporous gold structure, wherein the oxide particles are distributed homogeneously throughout the nanopores of the nanoporous gold structure.

15. The product as recited in claim 9, wherein the ligaments define a plurality of nanopores of the nanoporous gold structure, wherein the nanopores are distributed throughout the nanoporous gold structure, wherein the oxide particles are distributed homogeneously throughout the nanopores of the nanoporous gold structure.

16. The product as recited in claim 9, wherein the plurality of oxide particles have physical characteristics of being incubated at a particular temperature for a period of time sufficient to cause the oxide particles to have primarily a particular crystalline phase.

17. The product as recited in claim 1, wherein the oxide particles are distributed homogeneously throughout the nanopores of the nanoporous gold structure.

18. The product as recited in claim 1, wherein the plurality of oxide particles have physical characteristics of being:
    deposited by a process selected from the group consisting of: atomic layer deposition, liquid phase deposition, and wet chemical impregnation; and
    incubated at a temperature for a period of time sufficient to cause the oxide particles to have primarily the crystalline phase.

19. The product as recited in claim 9, wherein the conformal, continuous film covers all surfaces inside the nanoporous gold structure, the conformal, all portions of the continuous film in pores of the nanoporous gold structure having about a constant thickness.

* * * * *